Dec. 25, 1951 R. A. GRIEFEN ET AL 2,579,491
REPLENISHING NARROW-WARE LOOM
Filed Oct. 7, 1949 11 Sheets-Sheet 1

INVENTORS
RICHARD A. GRIEFEN
FRANZ C. MOSTERTZ
BY
ATTORNEY.

Dec. 25, 1951    R. A. GRIEFEN ET AL    2,579,491
REPLENISHING NARROW-WARE LOOM
Filed Oct. 7, 1949    11 Sheets-Sheet 3

INVENTORS
RICHARD A. GRIEFEN
FRANZ C. MOSTERTZ
BY
ATTORNEY.

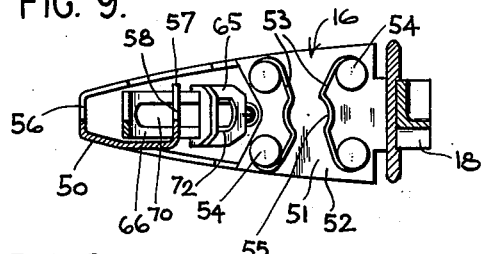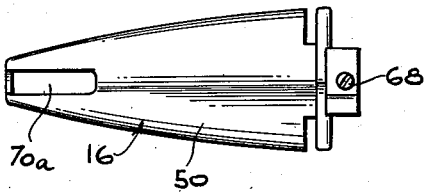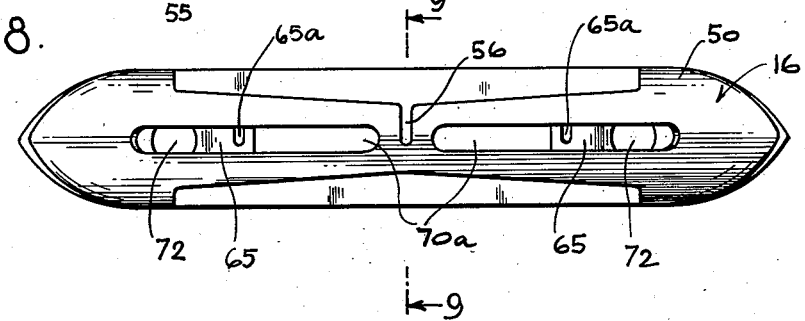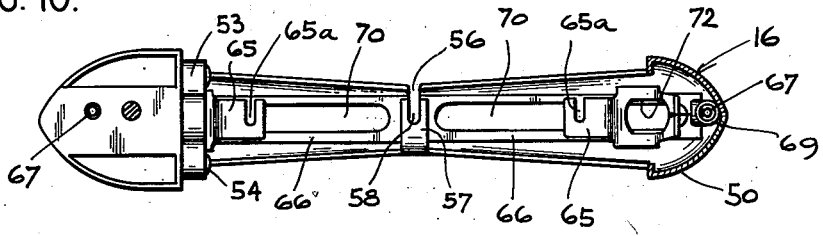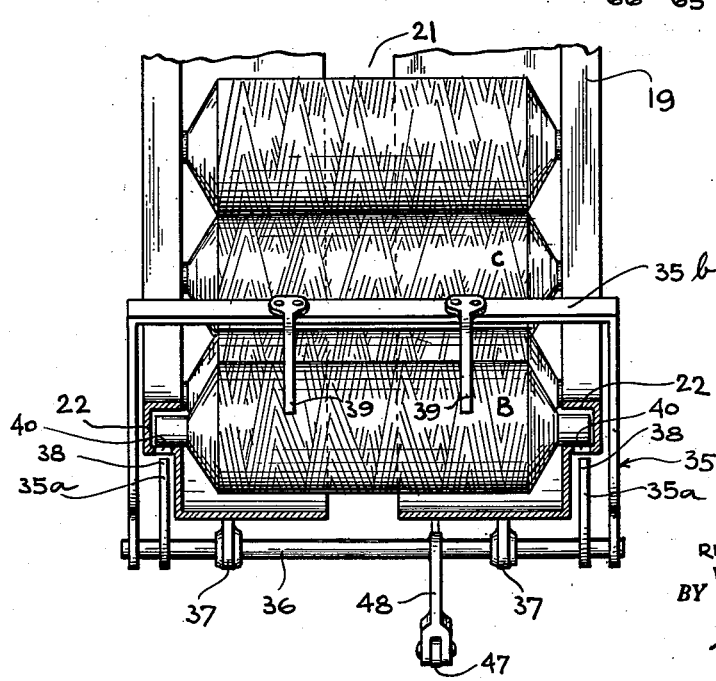

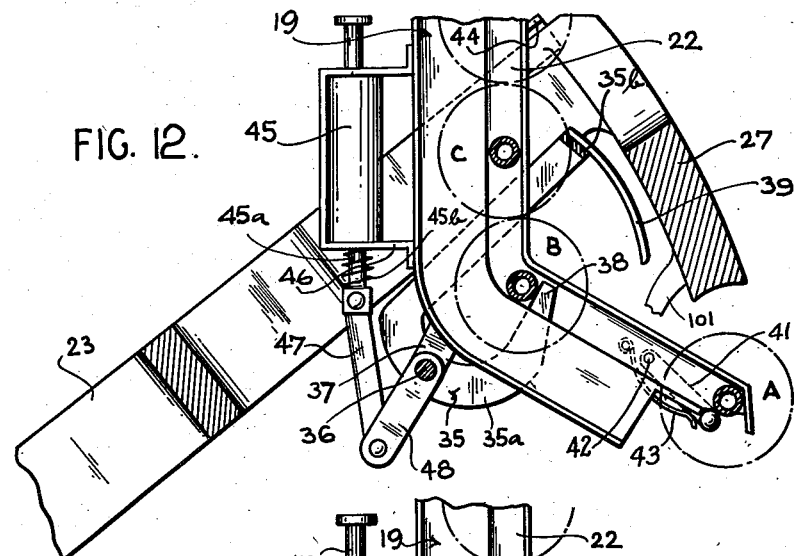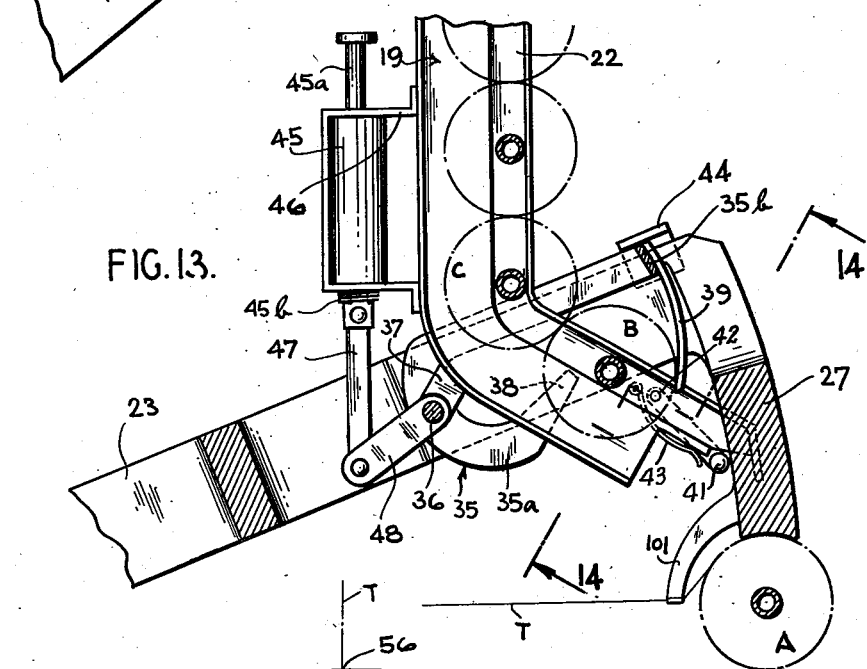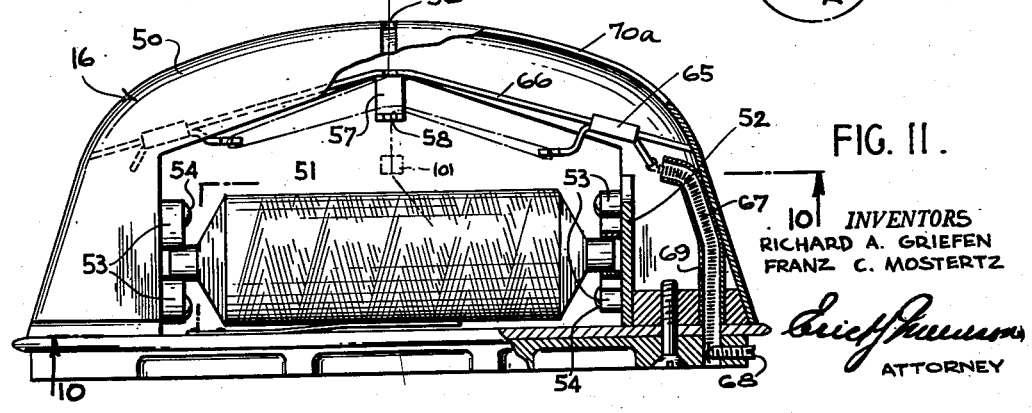

Dec. 25, 1951    R. A. GRIEFEN ET AL    2,579,491
REPLENISHING NARROW-WARE LOOM
Filed Oct. 7, 1949    11 Sheets-Sheet 6

INVENTORS
RICHARD A. GRIEFEN
FRANZ C. MOSTERTZ
BY
ATTORNEY.

INVENTORS
RICHARD A. GRIEFEN
FRANZ C. MOSTERTZ
BY
ATTORNEY.

Dec. 25, 1951  R. A. GRIEFEN ET AL  2,579,491
REPLENISHING NARROW-WARE LOOM
Filed Oct. 7, 1949  11 Sheets-Sheet 8

INVENTORS.
RICHARD A. GRIEFEN
FRANZ C. MOSTERTZ
BY *Eric J. Brunner*
ATTORNEY

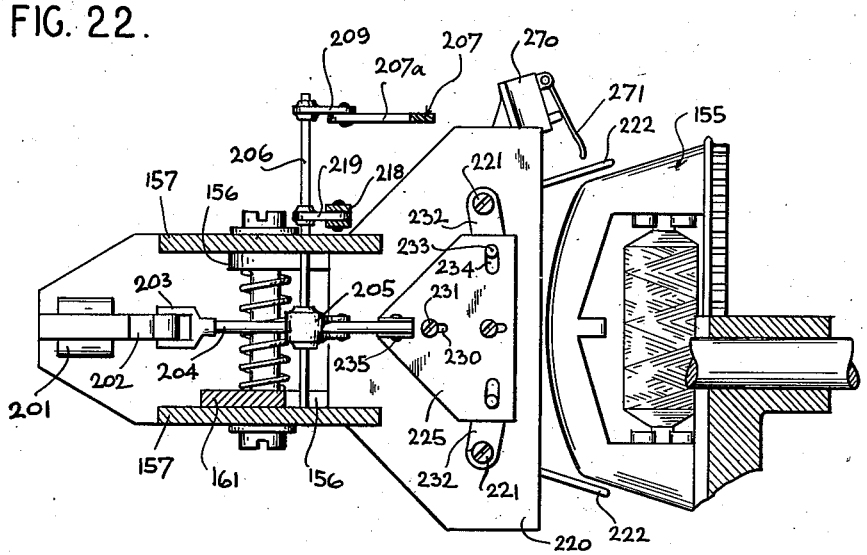
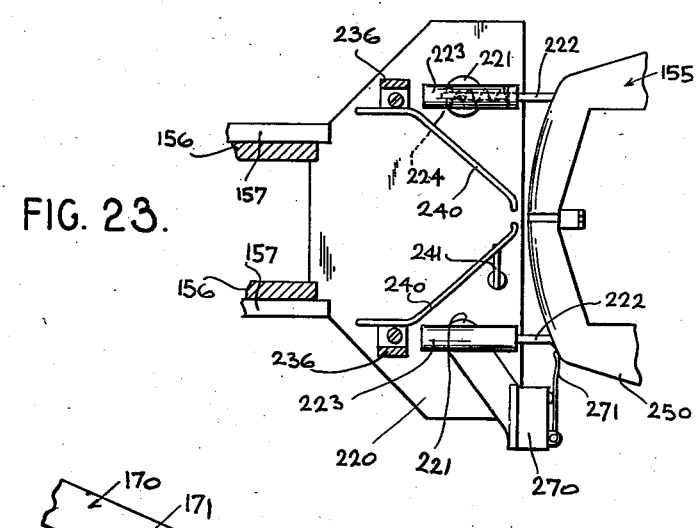

Dec. 25, 1951  R. A. GRIEFEN ET AL  2,579,491
REPLENISHING NARROW-WARE LOOM
Filed Oct. 7, 1949  11 Sheets-Sheet 10
FIG. 24.
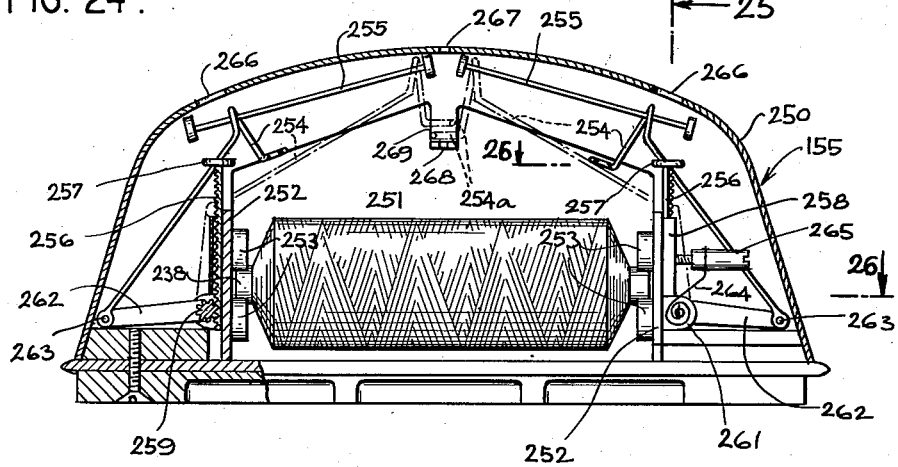
FIG. 25.
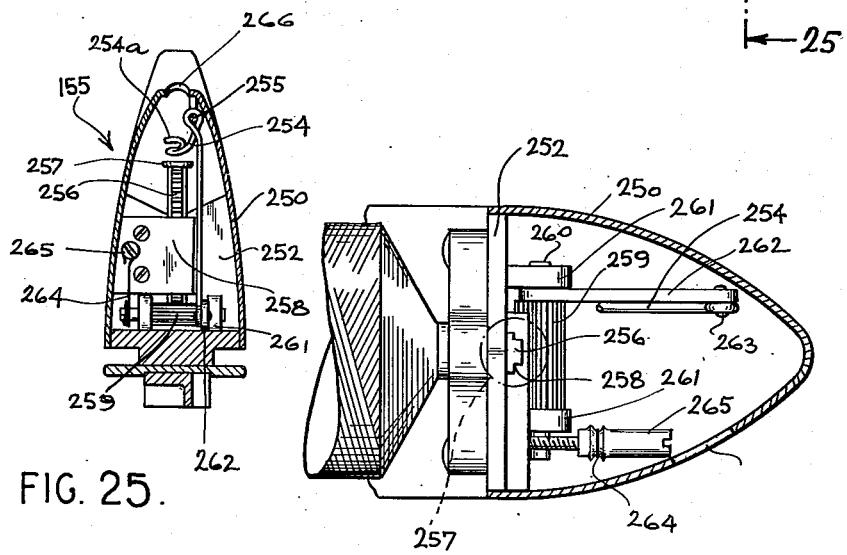
FIG. 26.
*INVENTORS*
RICHARD A. GRIEFEN
FRANZ C. MOSTERTZ
BY
ATTORNEY.

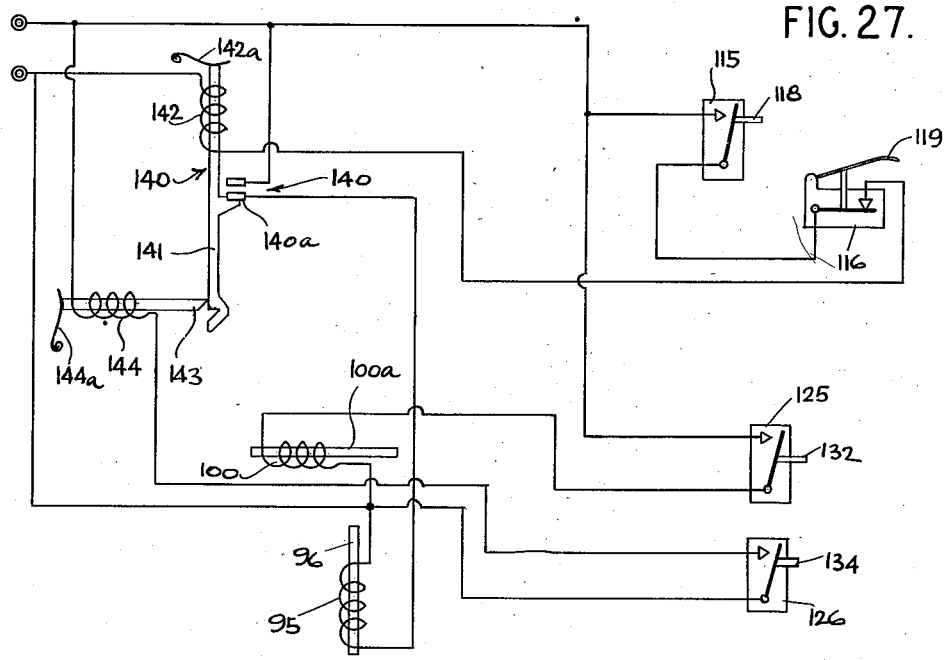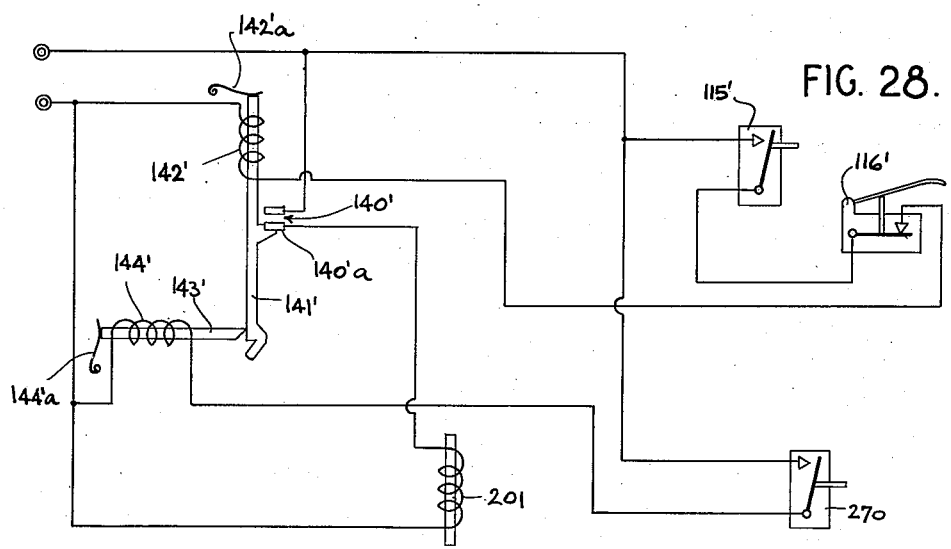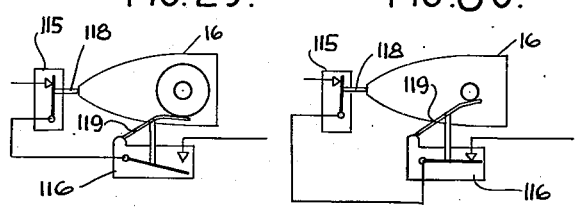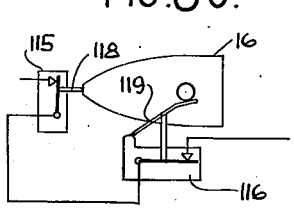

UNITED STATES PATENT OFFICE 2,579,491

REPLENISHING NARROW-WARE LOOM

Richard A. Griefen, Conshohocken, and Franz C. Mostertz, Philadelphia, Pa., assignors to Martin Fabrics Corporation, New York, N. Y., a corporation of New York Application October 7, 1949, Serial No. 120,078

18 Claims. (Cl. 139—243)

This invention relates to improvements in loom construction and is concerned more especially with looms of the narrow fabric type for weaving ribbons, tapes and the like.

Heretofore it has been necessary in narrow fabric looms to effect weft replenishment by interrupting the operation of the loom and manually replacing the exhausted quill in the loom shuttle with a fresh quill. It is a primary object of the present invention to provide a loom having automatic mechanism for positioning a fresh quill in the loom shuttle without requiring interruption of loom operation.

A further object of the invention is the provision of a loom having automatic mechanism of the character indicated which is operative not only to position a fresh quill in the loom shuttle but which simultaneously effects proper alignment and threading of the weft in the shuttle.

Another object of the invention is the provision of a novel shuttle construction allowing self-threading simultaneously with the positioning of a fresh quill in the shuttle.

In order to carry out the objects of the invention the shuttle is provided with a pair of oppositely disposed thread guides which are movable from normal separated position at opposite ends of the shuttle to an operative central thread-receiving position at the moment when a fresh quill is deposited in the shuttle. The thread guides are operated by a control mechanism fixed to the loom at a point defining one end of the trajectory of the shuttle, which point may be conveniently designated the magazine end of the loom because of the disposition thereat of the magazine retaining the fresh quills, and said control mechanism includes a pair of fingers which cooperate with the movable thread guides on the shuttle and swing them inwardly to their central operative thread-receiving position. When the loom is operating normally the control fingers are retained in inoperative position so as not to obstruct the trajectory of the shuttle or interfere with the shuttle thread guides until weft replenishment is indicated.

An important feature of the present invention resides in the fact that the indication of weft replenishment occurs always when the shuttle is at the end of its trajectory opposite the control mechanism and magazine end of the loom. For this purpose a pair of detecting switches which form part of an electrical control circuit are disposed on the loom frame at the end of the shuttle trajectory opposite the control mechanism and magazine. One of said switches indicates the position of the shuttle while the other indicates the condition of the quill retained in the shuttle. When the quill is empty and the shuttle arrives at the detecting station defined by the switches on the far side of the loom, both switches will close the electrical detecting circuit thereby energizing solenoid controls which operate to bring the fingers of the control mechanism at the opposite or magazine end of the loom into operative position awaiting the arrival of the shuttle from the far end or detecting end of the loom. Simultaneously a pivoted pawl attached to a lever operatively connected with a quill-feeding hammer element is elevated to operative position in order to be engaged by a ram formed on the loom batten. Thus when the shuttle completes its trajectory and arrives at the quill-changing station defined by the control mechanism at the magazine end of the loom, a fresh quill is deposited on the shuttle by the quill hammer, displacing the exhausted quill, and the control fingers, which have been previously arranged in operative position, actuate the movable thread guides of the shuttle in order to effect automatic threading of the shuttle.

The foregoing objects as well as additional objects and advantages of the invention will be readily apparent in the course of the following detailed description taken in connection with the accompanying drawings which illustrate preferred embodiments of the invention, and wherein:

Fig. 7 is a side elevation of the improved shuttle;

Fig. 8 is a front elevation of the shuttle;

Fig. 9 is a sectional view of the shuttle taken on line 9—9 of Fig. 8;

Fig. 10 is a sectional view of the shuttle taken on line 10—10 of Fig. 11;

Fig. 11 is a top plan view of the shuttle, partly broken away to show internal structure and relation of parts;

Figs. 12 and 13 are fragmentary detail views illustrating the action of the quill-feeding hammer in discharging a fresh quill from the quill magazine;

Fig. 14 is a sectional view taken on line 14—14 of Fig. 13, the hammer being omitted for purposes of clarity;

Fig. 21 is a detailed view of the quill retaining member at the lower end of the quill magazine channels illustrated in Figs. 19 and 20;

Fig. 22 is a bottom plan view of the shuttle and threading control mechanism of Figs. 15 and 16 illustrating the disposition of the control fingers in inoperative position during the normal operation of the loom prior to weft replenishment;

Fig. 23 is a top plan view of the structure of Fig. 22 illustrating the control fingers in parallel operative position in order to effect automatic threading of the shuttle upon indication of weft replenishment;

Fig. 24 is a longitudinal sectional view of a modified form of shuttle for use in conjunction with the threading control mechanism of Figs. 22 and 23;

Fig. 25 is a sectional view of the shuttle taken on line 25—25 of Fig. 24;

Fig. 26 is a sectional view of the shuttle taken on line 26—26 of Fig. 24;

Fig. 27 is a diagrammatic view of an electrical control circuit for use in connection with the loom construction illustrated in Figs. 1 to 14 inclusive;

Fig. 28 is a diagrammatic view of an electrical control circuit for use in connection with the loom construction illustrated in Figs. 15 to 26 inclusive;

Figure 1:
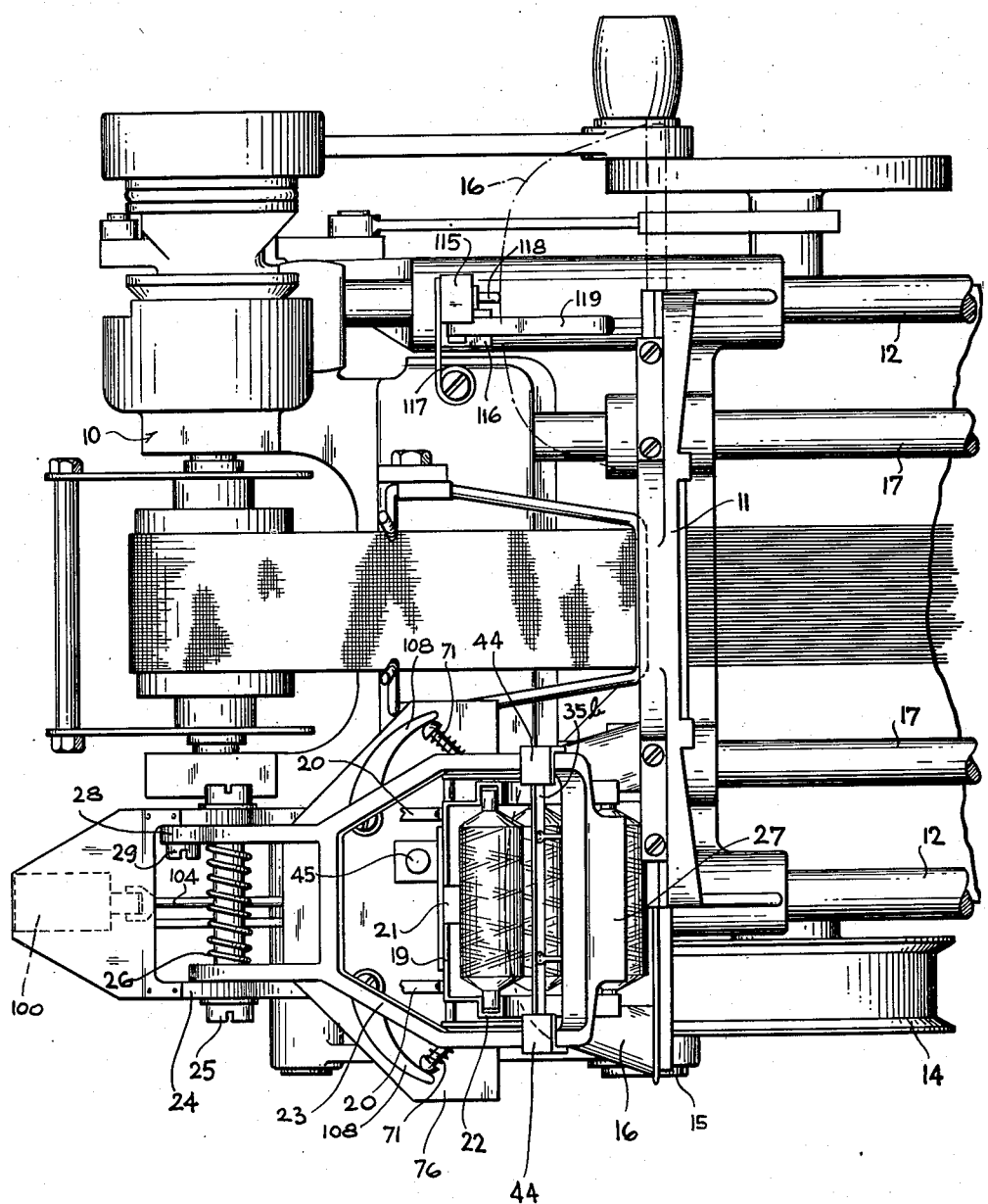
Fig. 1 is a plan view of a narrow fabric loom incorporating the features of the invention.

Fig. 29 is a diagrammatic view illustrating the position of the detecting switches on the far side of the loom opposite the magazine end for normal operation of the loom when the shuttle quill is not yet exhausted; and Fig. 30 is a similar view illustrating the closing of the electrical control circuit when the shuttle arrives at the far end of its trajectory, opposite the magazine end of the loom and the quill-changing station, with a substantially exhausted quill.

Referring now to the drawings in greater detail and more particularly to Figs. 1 to 14, the invention is shown as applied to a narrow fabric loom having a frame 10 which supports an oscillating batten 11. Batten 11 reciprocates on guide rods 12 and is oscillated by means of a crank rod 13 connected to the main driving wheel 14 of the loom at 15, as clearly shown in Fig. 2. As is conventional and well known, the shuttle 16 is reciprocated transversely with respect to the batten 11 as well as longitudinally with respect to the warp threads (see Fig. 1), since the shuttle is supported on the batten 11. The reciprocation of the shuttle 16 with respect to the batten 11 is effected by means of driving gears (not shown) retained within the batten and slidably keyed on the driving shafts 17 in well-known manner. The driving gears engage a rack 18 (see Figs. 3, 4 and 5) of shuttle 16 in order to impart transverse reciprocatory motion to the shuttle simultaneously with the oscillation of batten 11 in a longitudinal direction. The construction and operation of the batten and shuttle drive will not be further detailed here since they are of conventional character and do not in themselves form part of the present invention.

Fig. 1 illustrates the shuttle 16 in alternate positions at opposite ends of its trajectory, the shuttle being shown at the near or magazine end of the loom in full lines and at the opposite or far end of the loom in dotted outline. The magazine 19 is suitably supported, as by means of braces 20, at a level slightly above shuttle 16 so as to permit feeding of a fresh quill when the shuttle is at the end of its trajectory at the near end of the loom indicated in full lines in Fig. 1. Magazine 19 supports reserve quills in stacked relationship and is preferably formed with a central slot 21 in its rear wall permitting extension of the free yarn ends of the respective stacked quills (see Fig. 2) to a suction device or holder (not shown). The opposite sides of said magazine are formed as channels 22 serving to retain and guide the tips of the reserve quills during their downward passage through the magazine. A hammer-supporting member or yoke 23 is pivotally mounted on the loom frame between upright bearing supports 24 on a shaft 25 and is normally urged to the inoperative elevated position illustrated in dotted outline in Fig. 2 by means of a spring 26. The forward end of the yoke member 23 is formed as a hammer 27 adapted to engage the lowermost reserve quill in magazine 19 and drive the quill into the shuttle 16 when said shuttle has arrived at the magazine end of the loom in the full line position of Fig. 1 following the indication of weft exhaustion as will appear more fully hereinbelow. Yoke member 23 is formed with a lower extension 28 which is pivoted at 29 to a lever 30 which is in turn pivoted at 31 to the loom frame. A pawl 32 is pivotally mounted on lever 30 and is adapted to be elevated to the full line position of Fig. 2 upon indication of weft exhaustion for engagement by the ram 33 on batten 11.

A feed control member 35 is mounted on magazine 19 in such a manner as to regulate the passage of fresh quills one at a time from the interior of the magazine and into quill transferring position at the open lower end of the magazine. Said feed control member comprises a frame including a pair of side members 35a and an upper transverse member 35b. Side members 35a are fixed at their lower ends to a pivot shaft 36 which may be supported in bearing brackets 37 secured to magazine 19. As may be seen in Figs. 12, 13 and 14, a pair of lower fingers 38 is secured to shaft 36 and a pair of upper fingers 39 is secured to transverse frame member 35b. In the normal elevated position of control member 35 (see Fig. 12) lower fingers 38 protrude through suitably disposed slots 40 formed in the lower portions of magazine channels 22, said slots being most clearly illustrated in Fig. 14, and engage the tips of the lowermost reserve quill in the vertical portion of the magazine, which quill will be designated quill B. The next higher reserve quill is designated quill C and the quill which is in feeding position at the delivery end of the magazine is designated quill A. Quill A is releasably supported in feeding position awaiting the stroke of hammer 27 by a pair of retaining members 41 pivoted to the outer sides of magazine channels 22 at 42 and normally urged to operative position by leaf springs 43.

Hammer yoke 23 is provided with a pair of inwardly projecting striking lugs or abutments 44 which are adapted to engage and depress feed control member 35 during the downward operative stroke of said hammer yoke. When the hammer yoke undergoes its downward stroke following indication of weft exhaustion, quill A is driven into shuttle 16. Simultaneously feed control member 35 is depressed thereby releasing quill B and allowing it to advance until it strikes the depressed upper fingers 39 as shown in Figs. 13 and 14. By reason of the described arrangement quill B is retained clear of the path of the descending hammer 27 so as not to interfere with the positioning of quill A in shuttle 16. Upon elevation of hammer 27 quill B advances to the feeding position at the mouth of magazine 19 previously occupied by quill A and awaits repetition of the cycle of operations. Since the stroke of hammer 27 is relatively rapid, the return stroke of feed control member is preferably retarded as by means of an air cylinder 45 which may be supported on a bracket 46 fixed to magazine 19. The lower end of piston 45a of said air cylinder is operatively connected by means of a linkage 47 to an arm 48 fixed to pivot shaft 36 of feed control member 35. Spring 45b returns control member 35 to its initial position.

As has been previously pointed out, shuttle 16 is constructed and arranged in such a manner as to allow automatic threading upon the positioning of a fresh quill therein. Referring now to Figs. 7 to 11 of the drawings, shuttle 16 is formed with a hollow housing or body member 50 defining a quill compartment 51. The opposite ends of quill compartment 51 are defined by plates 52 and each of said end plates carries an opposed pair of spring clips 53 for retaining the ends of a quill. Spring clips 53 are attached at their outer ends to pins 54 and are preferably provided with central recesses 55 which engage therebetween opposite sides of the exposed quill tips, as best shown in Fig. 11. The top of housing 50 is provided with a central slot or recess 56. An inner projection or lug 57 may be struck from housing 50 and is provided with an auxiliary recess or slot 58 which cooperates with slot 56 for preliminary alignment of the free end of the quill thread in a central plane perpendicular to the axis of rotation of the quill in shuttle 16, as will be more fully described. A pair of thread tensioning guides or hooks 65 having thread-receiving slots 65a is slidably mounted on a supporting member 66 and said thread tensioning guides are normally retained in separated position on opposite sides of quill compartment 51, as shown in Fig. 11 by means of springs 67. Each of said springs 67 is secured to the outer end of a respective thread guide at one end and is secured at its opposite end by means of a set screw, 68. A tubular guiding and supporting member 69 is preferably surrounding each spring 66. Shuttle housing 50 and supporting member 66 are provided with aligned slots 70a and 70 respectively in order to allow engagement of actuating fingers 71 within apertures 72 formed in thread tensioning guides 65 for moving said thread tensioning guides to central aligned position and for effecting automatic threading of the shuttle. The construction and operation of the actuating fingers 71 and the related control mechanism therefor will now be described.

Figure 2:
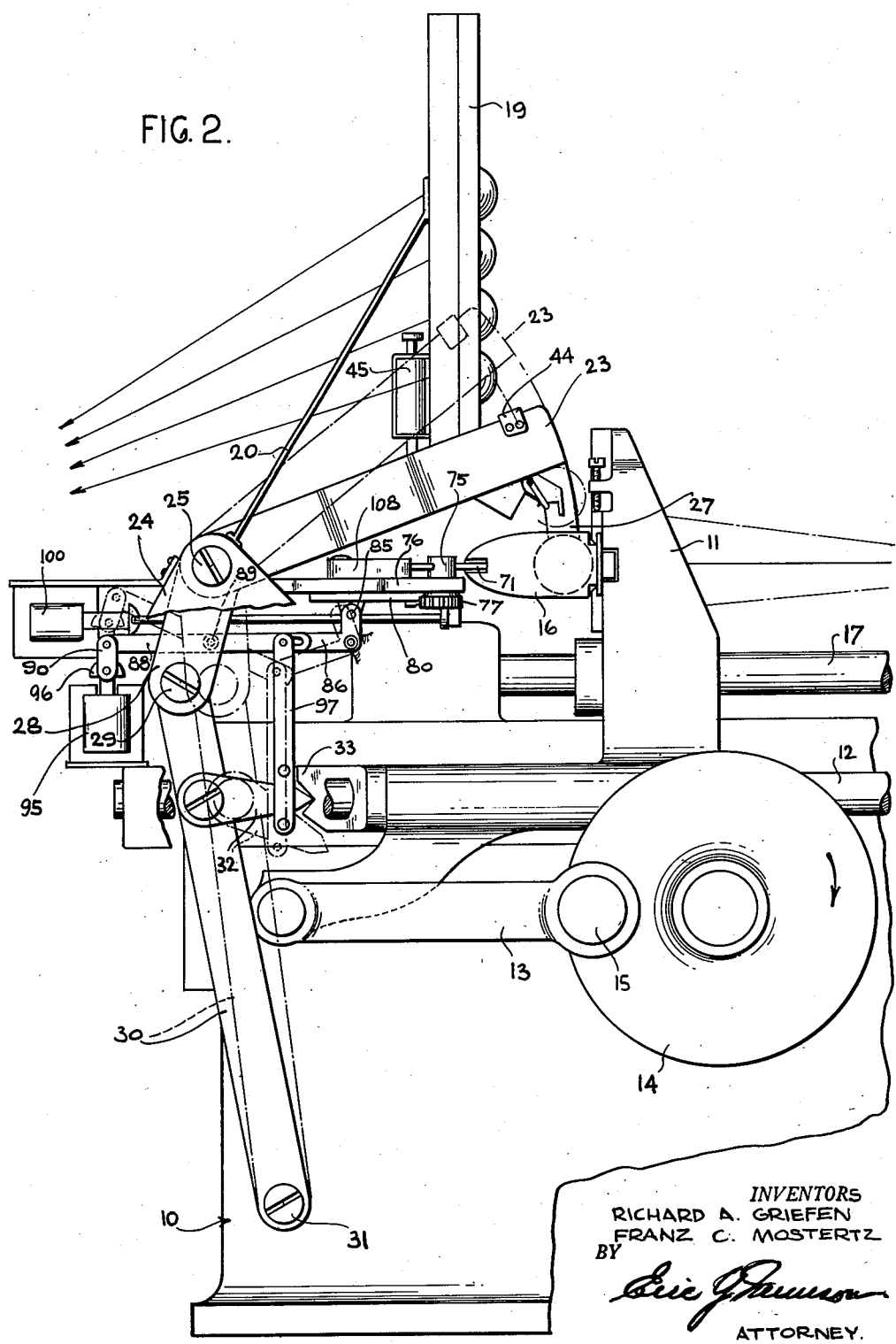
Fig. 2 is an elevational view, partly broken away, of the structure of Fig. 1.
Figure 3:
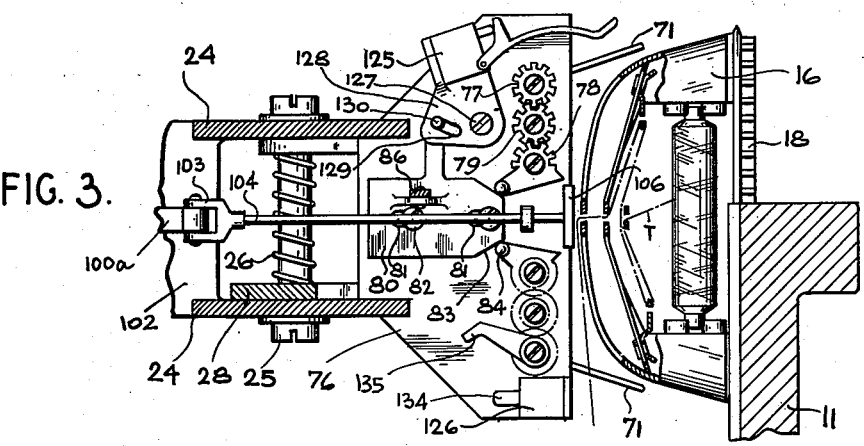
Fig. 3 is a bottom plan view of the shuttle and the threading control mechanism illustrating the relative disposition of parts during normal operation of the loom prior to weft replenishment.

Actuating fingers 71 are slidably mounted in pivot studs 75 carried by a fixed table 76 which is suitably secured to the loom frame on a level below magazine 19, as shown in Fig. 2. Referring now to Fig. 3, the lower end of each pivot stud 75 is provided with a gear wheel 77 which is driven by an inner gear segment 78 through an intermediate gear wheel 79. During the normal operation of the loom actuating fingers 71 are retained in the divergent inoperative position of Fig. 3 so as not to obstruct the trajectory of shuttle 16 or interfere with the movable thread tensioning guides 65 until the necessity for weft replenishment arises. Means are further provided which, upon indication of weft exhaustion by the electrical control circuit (illustrated in Figs. 27, 29 and 30) to be more fully described, are operative to move actuating fingers 71 to the substantially parallel operative position of Fig. 4 awaiting the arrival of the shuttle containing the exhausted quill which at this point of its trajectory arc moves in a course substantially parallel to the actuating fingers 71 which thus will be received within the slots 70 and 70a. It will be understood that the shuttle moves in an arc due to the back and forward reciprocation of the batten 11 and the lateral reciprocation of the shuttle. For the purpose of moving the fingers 71 a plate 80 is slidably mounted on the underside of table 76 as by means of the slots 81 through which extends screws 82. The forward end of plate 80 defines rearwardly divergent cam surfaces 83 adapted to engage projections 84 of inner gear segments 78. As plate 80 is moved to its forward limiting position of Fig. 4 from the inoperative position of Fig. 3, the actuating fingers 71 are caused to assume their parallel operative position. The forward shifting of plate 80 is preferably accomplished through the agency of a solenoid 95 by means of suitable linkages. As best shown in Fig. 2, plate 80 may be pivoted at 85 to one branch of a bell-crank lever 86 which is pivoted to a lever 88 which is in turn pivoted intermediate its ends at 89 to a suitable fixed support (not shown) of the loom frame. Solenoid plunger 96 is operatively connected to lever 88 by means of link 90. A lifting arm or lever 97 is also pivoted to lever 88 at its upper end and operatively connected at its lower end to pawl 32. Thus when solenoid 95 is energized by the electrical control circuit upon indication of weft exhaustion, not only are the actuating fingers 71 moved to operative parallel position, but pawl 32 is elevated to the full line position of Fig. 2 for engagement by the ram 33 on batten 11 in order to actuate the quill-changing hammer 27.

Figure 4:
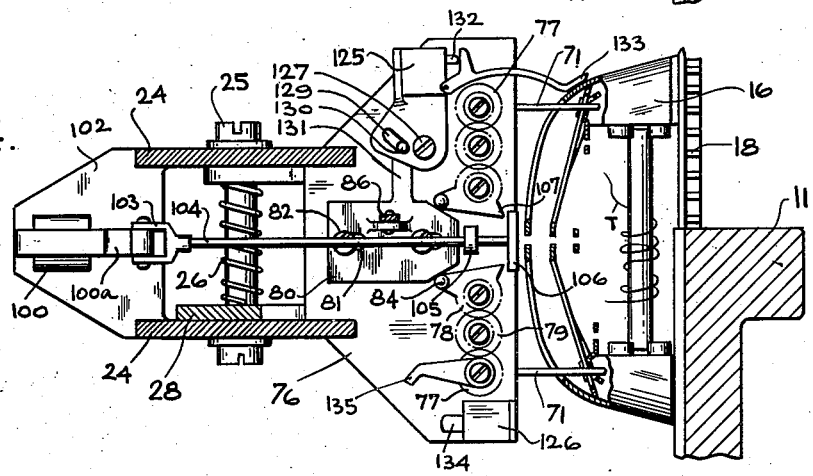
Figs. 4 and 5 are similar views illustrating the sequential steps in the arrival of the shuttle with an exhausted quill at the quill-changing station, the positioning of a fresh quill and the simultaneous automatic threading of the shuttle.
Figure 5:
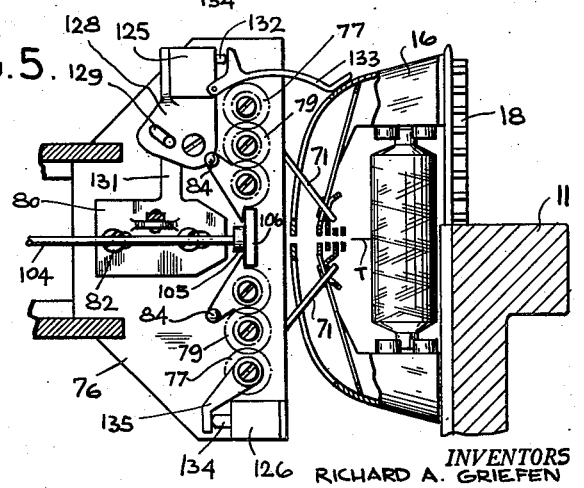

The arrival of shuttle 16 at the quill-changing station subsequent to the indication of weft exhaustion at the far end of the loom causes the energization of another solenoid 100 thereby effecting further rotation of the actuating fingers 71 from the position of Fig. 4 to the position of Fig. 5 and completing the threading operation by moving the thread tensioning guides 65 into central aligned position. In this latter position said thread guides engage the weft thread T of the newly positioned quill in their respective thread receiving slots 65a, the weft thread having been previously aligned between the spaced shuttle slots 56 and 58 by the action of a centrally position guide member 101 fixed to hammer 27 (see Fig. 13). Upon inactivation of fingers 71 at the termination of their operative threading stroke by the electrical control circuit to be described, thread guides 65 are retracted to their normal position of Fig. 11 by means of the springs 67.

Figure 6:
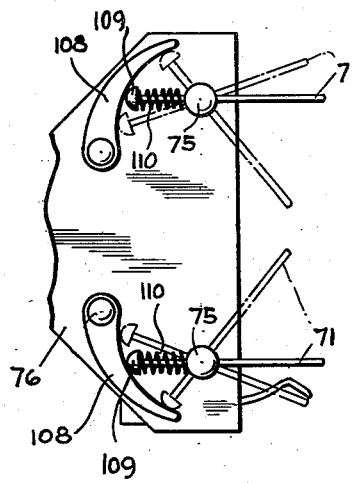
Fig. 6 is a fragmentary top plan view illustrating the manner of mounting the control fingers.

Solenoid 100 may be mounted on a plate 102 secured to bearing supports 24. Solenoid plunger 100a is joined by a yoke or connector 103 to a pull-rod 104 which may be supported in a hanger 105 depending from table 76 adjacent the forward edge thereof, as shown in Fig. 4. Pull-rod 104 is formed with a butt 106 adapted to engage lugs 107 formed integrally on inner gear segments 78 upon energization of solenoid 100 as may be seen from Figs. 4 and 5, said inner gear segments having been previously moved to the position of Fig. 4 upon indication of weft exhaustion, energization of solenoid 95 and forward shifting of plate 80, as heretofore described. The secondary rotation of inner gear segments 78 upon the energization of solenoid 100 is accompanied by the simultaneous rotation of outer gear wheels 77 of pivot studs 75, thereby effecting the operative stroke of actuating fingers 71. Provision is made for progressively increasing the effective length of fingers 71 during their operative stroke in order to maintain said fingers in continuous engagement within the apertures 72 of shuttle thread guides 65. For this purpose table 76 is provided on its upper surface with fixed eccentric cam guides 108 adjacent each of the finger pivot studs 75. Each of the fingers 71 is formed with an enlarged head 109 and a coil spring 110 is interposed between said head and pivot stud 75, as shown in Fig. 6. Furthermore, upon the inactivation of solenoid 100 at the completion of the operative stroke of fingers 71, springs 110 will operate to return the fingers to their outwardly divergent, normal position illustrated in Fig. 3.

As has been previously pointed out, the electrical control circuit is arranged in such a manner that the indication of weft exhaustion always occurs when the shuttle 16 is at the far end of its trajectory opposite the quill-changing station defined by table 76 and magazine 19. The position of the shuttle at which the necessity for weft replenishment is determined by the electrical control circuit is shown in dotted outline in Fig. 1 and will be conveniently designated the detecting station of the loom.

Fig. 1 further shows detecting switches 115 and 116 which may be supported on the loom frame in any suitable manner at the detecting station as by means of a supporting bracket 117. Switch 115 may be of the normally open type having a plunger 118 adapted to be engaged by the shuttle 16 when the shuttle is at the detecting station in order to close the switch. Switch 116 is of the normally closed type having a feeler 119 adapted to engage the quill when the shuttle is at the detecting station and to close the switch when the quill is substantially exhausted. The operation of detecting switches 115 and 116 is illustrated in Figs. 29 and 30, the latter figure showing that both of said switches will make contact simultaneously when the shuttle is at the detecting station and the quill is substantially exhausted. Referring back to Figs. 3, 4 and 5, it will be observed that switches 125 and 126 are mounted on opposite sides of the bottom surface of table 76. Switch 125 is pivotally mounted at 127 on the plate 128 having a slot 129 receiving a pin 130 carried at the end of a laterally extending arm 131 integral with slidable plate 80. Switch 125 is of the normally open type having a plunger 132 actuated by a pivoted contact arm 133 which is adapted to be engaged by the shuttle housing as the shuttle carrying the exhausted quill completes its trajectory from the detecting station and arrives at the quill-changing station, as shown in Fig. 4. Switch 126 is also of the normally open type having a plunger 134 adapted to close the switch at the termination of the operative stroke of the finger 71 by the action of contact arm 135 secured to adjacent outer gear wheel 77, as shown in Fig. 5. Switch 126 serves to inactivate the fingers 71 and allows restoration of the various described components of the quill-changing and threading mechanism to their normal positions illustrated in Fig. 3.

Finally, the manner in which the electrical circuit controls the sequential quill-changing and shuttle-threading operations will be described with reference to Fig. 27 which indicates the various switches and solenoids which have been described together with supplemental control elements which may be located on a control board remote from the loom.

When the shuttle 16 carrying a substantially exhausted quill arrives at the detecting station, detecting switches 115 and 116 make contact simultaneously closing the circuit to a relay switch 140. Relay switch 140 has a movable contact 140a mounted on the plunger 141 of solenoid 142 and the energization of solenoid 142 by the simultaneous closing of switches 115 and 116 closes relay switch 140. Switch 140 is held closed by latch 143 which is controlled by a separate solenoid 144. The closing of switch 140 energizes solenoid 95 which results in the preliminary alignment of the actuating fingers 71 and pivoted switch 125 in the position of Fig. 4 and in the elevation of pawl 32 to the position of Fig. 1, awaiting striking engagement by batten ram 33. As shuttle 16 arrives at the quill-changing station shown in Fig. 4, it closes switch 125 thereby energizing solenoid 100 which causes fingers 71 to complete their operative stroke and thread the shuttle in the manner previously described. At the termination of the operative stroke of fingers 71 contact arm 135 will close switch 126 thereby energizing solenoid 144 which retracts latch 143 and results in the opening of relay switch 140 whereupon the loom weaves normally until detecting switches 115 and 116 again indicate weft exhaustion on the shuttle quill. It will be noted that solenoids 142 and 144 are operative against the normal biasing tension of respective springs 142a and 144a.

Figure 15:
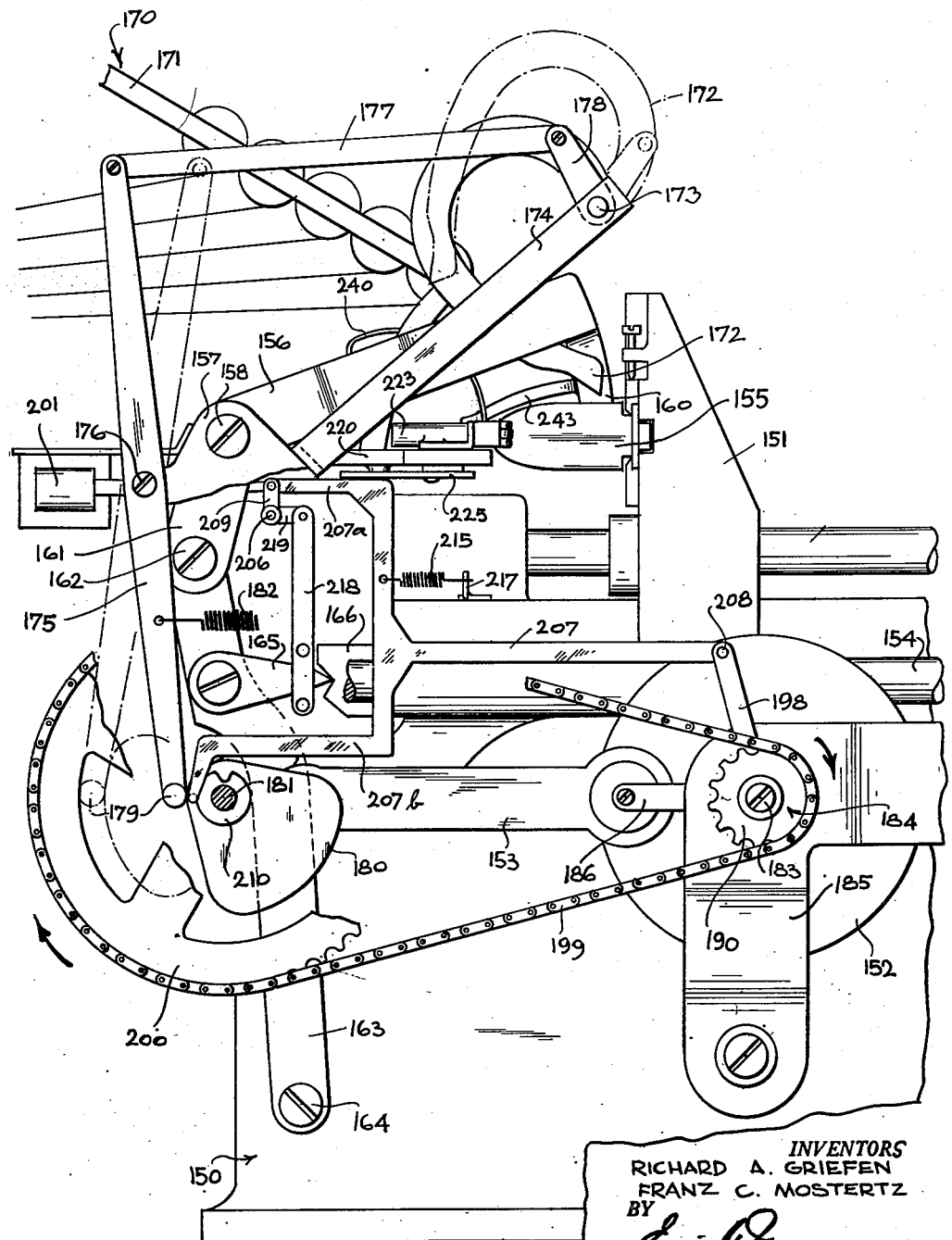
Fig. 15 is an elevational view of a modified form of loom construction embodying the features of the invention.
Figure 16:
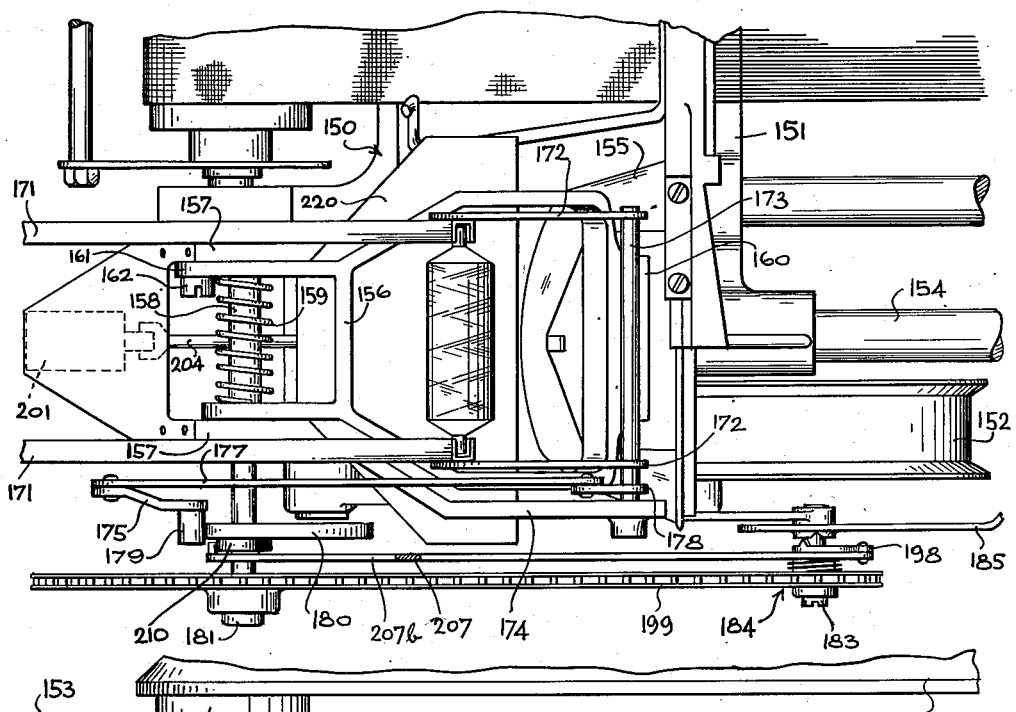
Fig. 16 is a plan view of the structure shown in Fig. 15.

Figs. 15 to 26 and 28 illustrate a modified form of loom construction embodying the features of the invention. Figs. 15 and 16 show a loom frame 150 which supports an oscillating batten 151 driven from main driving wheel 152 by means of a crank rod 153. Batten 151 reciprocates on guide rods 154 while shuttle 155 is reciprocated transversely with respect to batten 151 simultaneously with the longitudinal reciprocation of said batten as is conventional and well known. Fig. 16 illustrates shuttle 155 at one end of its trajectory at the quill-changing station of the loom. A hammer-supporting member or yoke 156 is pivotally mounted on the loom frame between upright bearing supports 157 on a shaft 158 and is normally urged to elevated inoperative position by means of a spring 159. The forward end of yoke member 156 is formed as a hammer 160 adapted to drive a fresh quill into shuttle 155 upon indication of weft exhaustion, as will appear more fully hereinafter. Yoke member 156 is formed with a lower extension 161 which is pivoted at 162 to a lever 163 which is in turn pivoted to the loom frame at 164. A pawl 165 is pivotally mounted on lever 163 and is adapted to be elevated to the position of Fig. 15 upon indication of weft exhaustion for engagement by the ram 166 on batten 151.

A downwardly inclined magazine 170 which preferably comprises a pair of spaced channel members 171 supports the reserve quills which are to be fed one at a time to the shuttle 155 upon indication of weft exhaustion. A pair of transferring arms 172 is fixed to a rocker shaft 173 mounted on a suitable support 174. Rocker shaft 173 is actuated upon indication of weft exhaustion to move transferring arms 172 from quill-transferring position above the shuttle (shown in full lines in Fig. 15) to quill-receiving position at the bottom of magazine 170 (the latter position of said arms being indicated in dotted outline in Fig. 15). For this purpose a cam lever 175 is pivotally mounted at 176 to the loom frame and the upper end of said cam lever is operatively connected by means of a linkage 177 to a rocker arm 178 fixed to rocker shaft 173. The lower end of cam lever 175 carries a roller 179 which engages an actuating cam 180 on cam shaft 181, said cam lever being held in operative engagement against cam 180 by means of a spring 182 anchored to a fixed loom support (not shown). Cam shaft 181 is rotated following indication of weft exhaustion from an idler shaft 183 controlled by a clutch mechanism generally designated by reference numeral 184.

Figure 17:
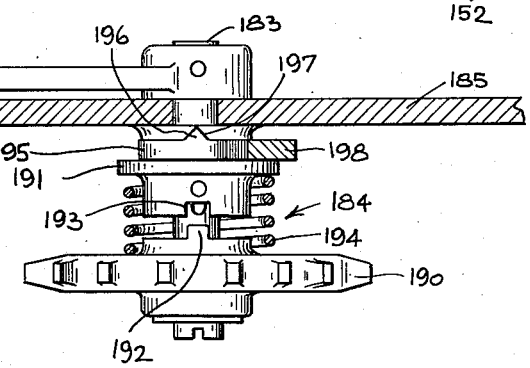
Figs. 17 and 18 are detail views of a clutch control mechanism for the quill-changing mechanism of Figs. 15 and 16 the clutch mechanism being shown in disengaged and engaged position respectively.
Figure 18:
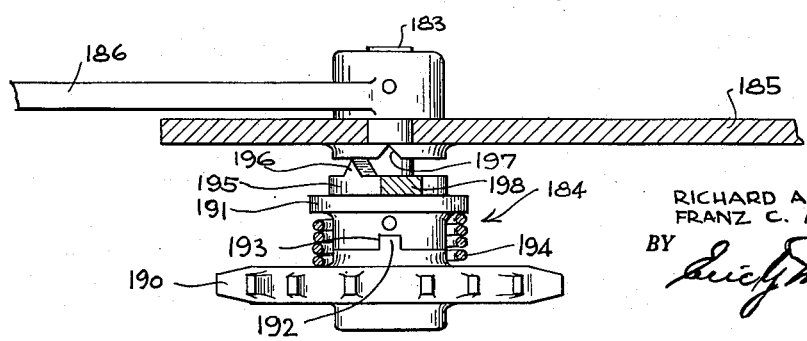

As best shown in Fig. 17, idler shaft 183 is supported in a bearing member 185 and is driven from main driving wheel 152 by means of a crank 186. A sprocket 190 is freely rotatable on idler shaft 183 for engagement with a clutch collar 191 slidably keyed on said idler shaft, said sprocket wheel having a tongue 192 insertable within a complementary recess 193 in said clutch collar. A spring 194 is interposed between said clutch collar and said sprocket for normally urging the members apart into the disengaged position illustrated in Fig. 17. A shifting member or ring 195 is disposed between clutch collar 191 and bearing member 185 and is provided with a claw 196 normally seated in a complementary recess 197 formed in said bearing member. A shifting lever 198 is fixed to or formed integrally with ring 195 for alternate engagement and disengagement of the clutch. Counterclockwise rotation of shifting lever 198 (as shown in Fig. 15) results in the engagement of sprocket 190 with the driving collar 191, as best shown in Fig. 18. A driving chain 199 interconnects idler sprocket 190 with another sprocket 200 mounted at the outer end of cam shaft 181.

Referring now to Figs. 15 and 22, the engagement of clutch mechanism 184 is effected upon indication of weft exhaustion by means of a solenoid 201 suitably mounted on the loom frame. Solenoid plunger 202 is joined by means of a connecting member 203 to a pull rod 204. Pull rod 204 is operatively connected by means of a link 205 with a pivot shaft 206 which is supported between bearing members 157. A control arm 207 having an upper branch 207a and a lower branch 207b is pivotally connected at 208 to the upper end of clutch lever 198. Upper branch arm 207a is operatively connected with pivot shaft 206 by a lever 209 fixed to said shaft. Thus when solenoid 201 is energized upon indication of weft exhaustion clutch lever 198 will be moved to the operative position of Fig. 18 by control arm 207 thereby effecting rotation of cam shaft 181 and causing oscillation of the quill-transferring arms in the manner previously described. Lower branch 207b of control arm 207 is arranged to engage a small cam 210 on cam shaft 181 in order to retain said control arm in its operative position of Fig. 15 for a complete revolution of said cam shaft since solenoid 201 will be energized only momentarily during the time interval required for the passage of the shuttle from the detecting station at the far side of the loom (not shown) to the quill-changing station (shown in Figs. 15 and 16) at the magazine end of the loom. At the completion of a single revolution of cam shaft 181 control arm 207 will be restored to normal inoperative position thereby shifting clutch lever 198 to the position of Fig. 17 and disengaging clutch 184. A spring 215 attached to control arm 207 at one end and anchored at its other end to a frame bracket 217 operates to retract said control arm.

The energization of solenoid 201 also accomplishes the elevation of pawl 165 to the operative position of Fig. 17 by means of a linkage 218 operatively connected to said pawl at its lower end and pivoted at its upper end to a fixed lever 219 of pivot shaft 206.

Solenoid 201 also actuates threading control mechanism mounted on fixed table 220 in order to accomplish automatic threading of shuttle 155. Referring to Figs. 22 and 23 said control mechanism includes pivot studs 221 which carry at their upper ends actuating fingers 222 retained in bearing sleeves 223. Said fingers are preferably retractible under excessive load by the presence of springs 224 within sleeves 223 as a safety feature. Fingers 222 are normally retained in outwardly divergent inoperative position (Fig. 22) from which they are movable to substantially parallel operative position (see Fig. 23) by the energization of solenoid 201. For this purpose a slidable plate 225 is secured to the underside of table 220 as by means of slots 230 through which extend screws 231. Fixed arms 232 are carried at the bottom of pivot studs 221 and said arms carry pins 233 which are engaged in slots 234 of plate 225. Finally, pull-rod 204 is pivoted at 235 to plate 225 so that the energization of solenoid 201 will be accompanied by rearward shifting of said plate and the disposition of fingers 222 in the operative position of Fig. 23 awaiting arrival of the shuttle from the far end of the loom.

Figure 19:
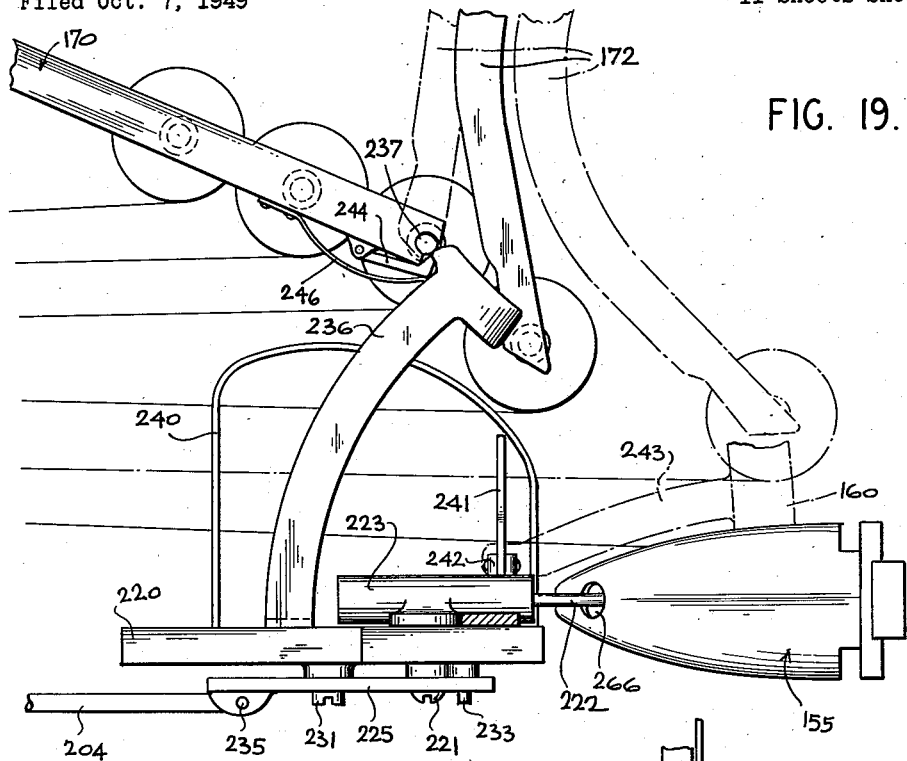
Figs. 19 and 20 are detailed side and front elevations respectively illustrating the operation of the quill-carrying arms of the embodiment of Figs. 15 and 16.
Figure 20:
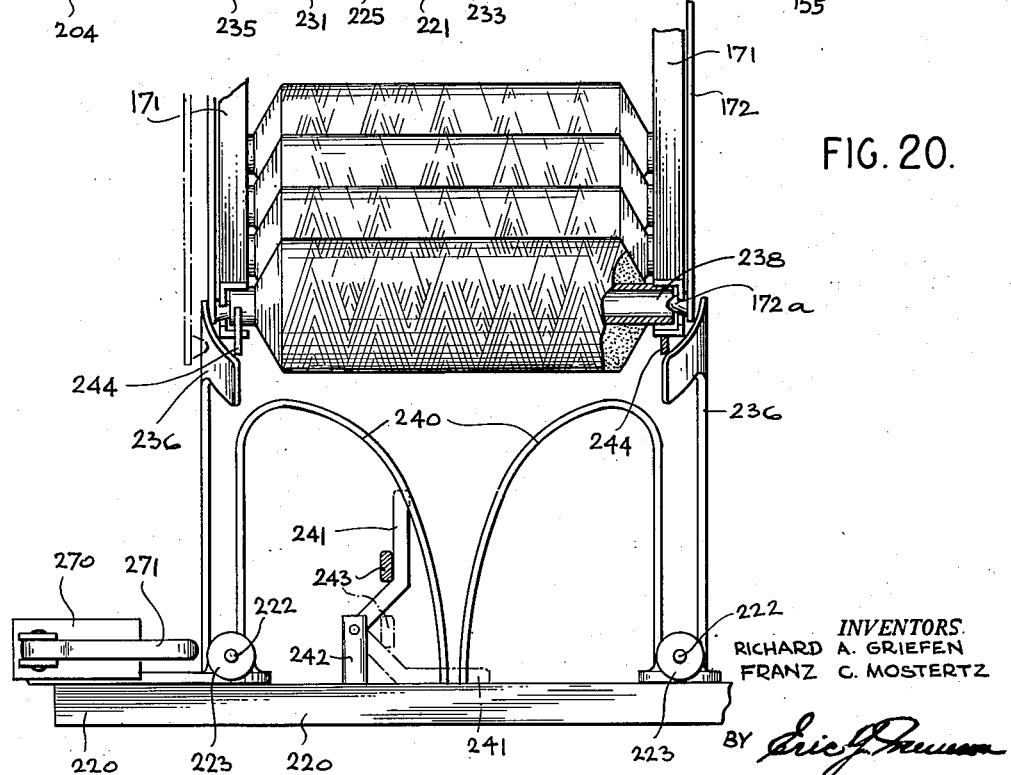

Figs. 19, 20 and 21 illustrate the operation of the quill-transferring arms 172. Quill-transferring arms 172 move rearwardly toward magazine 170 after having released a fresh quill to the shuttle during the operative downward stroke of hammer 160. A pair of resilient guide members 236 are mounted on table 220 in order to control the path of arms 172. As said arms move rearwardly they are directed along the outer surfaces of guide members 236 and slightly spread apart due to their natural resilience. Magazine channels 171 are formed at their lower end with notches or recesses 237 in order to make accessible the quill tips 238. The ends of arms 172 are formed with hold projections 172a which enter the internal bore of the lowermost quill as said arms complete their rearward travel and snap toward recesses 237 as they clear guide members 236. During their retractive or forward stroke arms 172 pass along the inner surfaces of guide members 236 (which are forwardly convergent as shown in Fig. 20) and maintain a firm grip on the fresh quill held between the arms. At the completion of their forward stroke arms 172 continue to hold the fresh quill pending the indication of weft exhaustion and the descending blow of hammer 160.

Table 220 is provided with a pair of wire guides 240 to aid in properly aligning the end of the quill thread along the centerline of the table. Auxiliary aligning means may also be provided in the form of member 241 which is pivoted to a support 242 and which is adapted to be lowered against the terminal end of the quill thread by a rearward extension 243 affixed to hammer 160. As seen in Fig. 21 the lowermost quill in magazine 170 is releasably held in transfer position in alignment with notches 237 by retaining members 244 pivoted to the underside of each channel member 171 at 245 and normally supported by a leaf spring 246.

Figs. 24, 25 and 26 illustrate shuttle 155 having a housing 250 defining a quill compartment 251 having fixed side plates 252. Each side plate is provided with an opposed pair of spring clip members 253 for retaining the quill tips 238. A pair of movable thread guides 254 are slidably retained on supporting rods 255 for movement from the normal separated position at opposite sides of compartment 251 (in full lines in Fig. 24) to centrally aligned threading position (in dotted outline in Fig. 24). Rack bars 256 having enlarged heads 257 are slidable in bearings 258 and mesh with pinions 259 carried on a shaft 260 supported between brackets 261. An oscillating lever 262 is mounted at one end of shaft 260 and is pivoted at 263 to the lower extremity of a respective thread guide 254. A return spring 264 is secured at one end to pinion shaft 260 and at its other end to a set screw 265 for effecting variable tension on thread guides 254. Apertures 266 are provided in shuttle housing 250 in alignment with rack bars 256 in order to permit the operative engagement of actuating fingers 222 against the heads 257 of said rack bars. As best shown in Fig. 24, the top of housing 250 is provided with a central slot or eye 267 and an auxiliary eye 268 spaced from eye 267 and formed on an integral extension 269 of said housing. Eyes 267 and 268 receive the extended quill thread which is subsequently deposited in the eyes 254a of thread guides 254 when rack bars 256 are depressed.

The sequence of operations is determined by the electrical control circuit illustrated in Fig. 28 which includes the series-connected detecting switches 115' and 116'. When the shuttle is on the far side of the loom and the shuttle quill is substantially exhausted both of said detecting switches close simultaneously closing the circuit to relay switch 140'. Relay switch 140' has a movable contact 140'a mounted on the plunger 141' of solenoid 142', and the energization of solenoid 142' closes relay switch 140'. Switch 140' is held closed by latch 143' which is controlled by another solenoid 144'. The closing of switch 140' energizes solenoid 201 to effect the operations previously described. Reverting back to Fig. 23, one of the pivot studs 221 is provided with a switch 270 mounted for pivotal movement therewith simultaneously with the movement of actuating fingers 222 to operative position. Switch 270 is of the normally open type and is provided with a pivoted contact arm 271 adapted to be engaged by shuttle housing 250 at the termination of the trajectory of the shuttle. Upon the closing of switch 270, solenoid 144' is energized thereby retracting latch 143' and opening relay switch 140' whereupon the loom weaves normally until detecting switches 115' and 116' again indicate weft exhaustion on the shuttle quill. Solenoids 142' and 144' are operative against the normal biasing tension of respective springs 142'a and 144'a.

Since certain modifications may be made in the device of the present invention without departing from the scope thereof, it is intended that all matter contained in the foregoing specification and shown in the accompanying drawings be interpreted merely as illustrative and not in a limiting sense.

What is claimed is:

1. In a loom having a shuttle defining a trajectory from one side of the loom to the other side thereof, a quill magazine disposed at a point defining one end of the shuttle trajectory quill feeding means cooperating with said magazine for depositing a fresh quill in said shuttle upon indication of weft exhaustion, weft-detecting means disposed at a point defining the opposite end of the shuttle trajectory for indicating exhaustion of weft in the shuttle, said shuttle having a quill compartment, a fixed centrally disposed slot opening upwardly toward said quill feeding means, a pair of movable thread tensioning guides normally disposed at opposite ends of said quill compartment and movable to operative threading position in alignment with said fixed slot, each of said thread tensioning guides having an upwardly opening, weft-receiving slot, and threading means disposed at the magazine end of the loom for moving said thread tensioning guides to operative threading position upon arrival of the exhausted shuttle at the magazine end of its trajectory subsequent to the indication of weft exhaustion, and means for spreading said tensioning guides towards their normal positions.

2. In a loom having a shuttle defining a trajectory from one side of the loom to the other side thereof, a quill magazine disposed at a point defining one end of the shuttle trajectory, quill feeding means cooperating with said magazine for depositing a fresh quill in said shuttle upon indication of weft exhaustion, electrical weft-detecting means disposed at a point defining the opposite end of the shuttle trajectory for indicating exhaustion of weft in the shuttle, said shuttle having a quill compartment, a fixed centrally disposed slot opening upwardly toward said quill feeding means, a pair of movable thread tensioning guides normally disposed at opposite ends of said quill compartment and movable to operative threading position in alignment with said fixed slot, each of said thread tensioning guides having an upwardly opening, weft-receiving eye, and threading means disposed at the magazine end of the loom and controlled by said weft-detecting means for moving said thread guides to operative threading position upon arrival of the exhausted shuttle at the magazine end of its trajectory subsequent to the indication of weft exhaustion, and means for spreading said tensioning guides towards their normal positions.

3. In a loom having a shuttle defining a trajectory from one side of the loom to the other side thereof, a quill magazine disposed at a point defining one end of the shuttle trajectory, quill feeding means cooperating with said magazine for depositing a fresh quill in said shuttle upon indication of weft exhaustion, weft-detecting means disposed at a point defining the opposite end of the shuttle trajectory for indicating exhaustion of weft in the shuttle, said shuttle having a quill compartment, a main fixed centrally disposed slot opening upwardly toward said quill feeding means, an auxiliary fixed upwardly opening slot spaced from said main fixed slot, a pair of movable thread tensioning guides normally disposed at opposite ends of said quill compartment and movable to operative threading position in alignment with said main and auxiliary fixed slots, each of said thread tensioning guides having an upwardly opening, weft-receiving slot, and threading means disposed at the magazine end of the loom for moving said thread guides to operative threading position upon arrival of the exhausted shuttle at the magazine end of its trajectory subsequent to the indication of weft exhaustion, and means for spreading said tensioning guides towards their normal positions.

4. In a loom having a shuttle defining a trajectory from one side of the loom to the other side thereof, a quill magazine disposed at a point defining one end of the shuttle trajectory, quill feeding means cooperating with said magazine for depositing a fresh quill in said shuttle upon indication of weft exhaustion, electrical weft-detecting means disposed at a point defining the opposite end of the shuttle trajectory for indicating exhaustion of weft in the shuttle, said shuttle having a quill compartment, a main fixed centrally disposed slot opening upwardly toward said quill feeding means, an auxiliary fixed upwardly opening slot spaced from said main fixed slot, a pair of movable thread tensioning guides normally disposed at opposite ends of said quill compartment and movable to operative threading position in alignment with said main and auxiliary fixed slots, each of said thread guides having an upwardly opening, weft-receiving slot, and threading means disposed at the magazine end of the loom and controlled by said weft-detecting means for moving said thread tensioning guides to operative threading position upon arrival of the exhausted shuttle at the magazine end of its trajectory subsequent to the indication of weft exhaustion, and means for spreading tensioning guides towards their normal positions.

5. In a loom having a shuttle defining a trajectory from one side of the loom to the other side thereof, a quill magazine disposed at a point defining one end of the shuttle trajectory, quill feeding means cooperating with said magazine for depositing a fresh quill in said shuttle upon indication of weft exhaustion, weft-detecting means disposed at a point defining the opposite end of the shuttle trajectory for indicating exhaustion of weft in the shuttle, said shuttle having a quill compartment, a main fixed centrally disposed slot opening upwardly toward said quill feeding means, an auxiliary fixed upwardly opening slot spaced from said main fixed eye, a pair of movable thread tensioning guides normally disposed at opposite ends of said quill compartment and movable to operative threading position in alignment with said main and auxiliary fixed slots, each of said thread tensioning guides having an upwardly opening, weft-receiving slot, and threading means including pivoted actuating fingers disposed at the magazine end of the loom for moving said thread tensioning guides to operative position upon arrival of the exhausted shuttle at the magazine end of its trajectory subsequent to the indication of weft exhaustion.

6. A loom in accordance with claim 5 further characterized in that said actuating fingers are controlled by said weft-detecting means.

7. A loom in accordance with claim 5 further characterized in that said movable thread guides are provided with apertures for the reception of said pivoted actuating fingers thereby allowing movement of said thread tensioning guides to operative threading position.

8. In a loom having a shuttle defining a trajectory from one side of the loom to the other side thereof, a quill magazine disposed at a point defining one end of the shuttle trajectory, quill feeding means cooperating with said magazine for depositing a fresh quill in said shuttle upon indication of weft exhaustion, weft-detecting means disposed at a point defining the opposite end of the shuttle trajectory for indicating exhaustion of weft in the shuttle, said shuttle having a quill compartment, a main fixed centrally disposed slot opening upwardly toward said quill feeding means, an auxiliary fixed upwardly opening slot spaced from said main fixed slot, a pair of movable thread tensioning guides normally disposed at opposite ends of said quill compartment and movable to operative threading position in alignment with said main and auxiliary fixed slots, each of said thread tensioning guides having an upwardly opening, weft-receiving slot, a depressible rack bar associated with each of said thread tensioning guides, a pinion meshing with a respective rack bar and a lever operatively connecting each pinion with a respective thread tensioning guide, and actuating fingers disposed at the magazine end of the loom for depressing said rack bars and moving said thread tensioning guides to operative threading position upon arrival of the exhausted shuttle at the magazine end of its trajectory subsequent to the indication of weft exhaustion, and means for spreading said tensioning guides towards their normal positions.

9. A loom in accordance with claim 8 further characterized in that said actuating fingers are controlled by said weft-detecting means.

10. In a loom having a batten and a shuttle defining a trajectory from one side of the loom to the other side thereof, a quill magazine disposed at a point defining one end of the shuttle trajectory, a quill feeding hammer pivotally mounted on the loom and cooperating with said magazine for depositing a fresh quill in said shuttle upon indication of weft exhaustion, weft-detecting means disposed at a point defining the opposite end of the shuttle trajectory for indicating exhaustion of weft in the shuttle, a lever pivoted to the loom at its lower end and pivoted to said quill feeding hammer at its upper end, an elevatable pawl carried by said lever, a ram formed on said batten and adapted to engage said pawl subsequent to indication of weft exhaustion when the exhausted shuttle arrives at the magazine end of its trajectory, said shuttle having a quill compartment, a main fixed centrally disposed slot opening upwardly toward said quill feeding hammer, an auxiliary fixed upwardly opening slot spaced from said main fixed slot, a pair of movable thread tensioning guides normally disposed at opposite ends of said quill compartment and movable to operative threading position in alignment with said main and auxiliary fixed slots, each of said thread tensioning guides having an upwardly opening, weft-receiving eye, and threading means disposed at the magazine end of the loom for moving said thread tensioning guides to operative threading position upon the arrival of the exhausted shuttle at the magazine end of its trajectory subsequent to the indication of weft exhaustion, and means for spreading said tensioning guides towards their normal positions.

11. A loom in accordance with claim 10 further characterized in that said threading means is controlled by said weft-detecting means.

12. In a loom having a shuttle defining a trajectory from one side of the loom to the other side thereof, a quill magazine disposed at a point defining one end of the shuttle trajectory, a quill feeding hammer pivotally mounted on the loom and cooperating with said magazine for depositing a fresh quill in said shuttle upon indication of weft exhaustion, periodically oscillating quill-transferring arms for transporting fresh quills from said quill magazine to a rest position in the downward path of said quill feeding hammer, weft-detecting means disposed at a point defining the opposite end of the shuttle trajectory for indicating exhaustion of weft in the shuttle, a periodically operated cam shaft having an actuating cam thereon, a cam lever operatively connected with said quill-transferring arms and cooperating with said actuating cam and a clutch-controlled idler shaft for driving said cam shaft upon indication of weft exhaustion, said shuttle having a quill compartment, a main fixed centrally disposed slot opening upwardly toward said quill feeding hammer, an auxiliary fixed upwardly opening slot spaced from said main fixed slot, a pair of movable thread tensioning guides normally disposed at opposite ends of said quill compartment and movable to operative threading position in alignment with said main and auxiliary fixed slots, each of said thread guides having an upwardly opening, weft-receiving slot, and threading means disposed at the magazine end of the loom for moving said thread tensioning guides to operative threading position upon arrival of the exhausted shuttle at the magazine end of its trajectory subsequent to the indication of weft exhaustion, and means for spreading said tensioning guides towards their normal positions.

13. In a loom having a shuttle defining a trajectory from one side of the loom to the other side thereof, a quill magazine disposed at a point defining one end of the shuttle trajectory, a quill feeding hammer pivotally mounted on the loom and cooperating with said magazine for depositing a fresh quill in said shuttle upon indication of weft exhaustion, periodically oscillating quill-transferring arms for transporting fresh quills from said quill magazine to rest position in the downward path of said quill feeding hammer, weft-detecting means disposed at a point defining the opposite end of the shuttle trajectory for indicating exhaustion of weft in the shuttle, a periodically operated cam shaft having an actuating cam thereon, a cam lever operatively connected with said quill-transferring arms and cooperating with said actuating cam and a clutch-controlled idler shaft for driving said cam shaft upon indication of weft exhaustion, said shuttle having a quill compartment, a main fixed centrally disposed slot opening upwardly toward said quill feeding hammer, an auxiliary fixed upwardly-opening slot spaced from said main fixed slot, a pair of movable thread tensioning guides normally disposed at opposite ends of said quill compartment and movable to operative threading position in alignment with said main and auxiliary fixed slots, each of said thread guides having an upwardly opening, weft-receiving slot, a depressible rack bar associated with each of said thread tensioning guides, a pinion meshing with a respective rack bar and a lever operatively connecting each pinion with a respective thread tensioning guide, and actuating fingers disposed at the magazine end of the loom for depressing said rack bars and moving said thread tensioning guides to operative threading position upon arrival of the exhausted shuttle at the magazine end of its trajectory subsequent to the indication of weft exhaustion, and means for spreading said tensioning guides to their normal positions.

14. A loom in accordance with claim 13 wherein said quill magazine comprises a pair of downwardly inclined channel-shaped members for retaining the ends of the quill, each of said channel-shaped members being formed at its lower end with an inwardly extending notch, said quill-transferring arms having terminal projections insertable within said notches and within the quill ends for transporting the lowermost quill from said magazine to rest position in the downward path of said quill feeding hammer.

15. A self-threading shuttle comprising a housing defining a quill compartment open at the top and bottom thereof, retaining elements disposed at opposite sides of said compartment for rotatably supporting a quill, said housing having a fixed centrally disposed upwardly-opening slot, a pair of movable thread tensioning guides normally disposed at opposite ends of said quill compartment and movable to operative threading position in alignment with said fixed slot, each of said thread tensioning guides having an upwardly-opening, weft-receiving slot, and spring means biasing said thread guides toward normal separated position at opposite ends of said quill compartment.

16. A self-threading shuttle comprising a housing defining a quill compartment open at the top and bottom thereof, retaining elements disposed at opposite sides of said compartment for rotatably supporting a quill, said housing having a fixed centrally disposed upwardly-opening slot, a pair of movable thread tensioning guides normally disposed at opposite ends of said quill compartment and movable to operative threading position in alignment with said fixed slot, each of said thread tensioning guides having an upwardly-opening, weft-receiving slot, a depressible rack bar associated with each of said thread tensioning guides, a pinion meshing with a respective rack bar, a lever operatively connecting each pinion with a respective thread tensioning guide, and spring means biasing said thread guides toward normal separated position at opposite ends of said quill compartment.

17. A self-threading shuttle comprising a housing defining a quill compartment open at the top and bottom thereof, retaining elements disposed at opposite sides of said compartment for rotatably supporting a quill, said housing having a main fixed centrally disposed upwardly-opening slot, an auxiliary fixed upwardly opening slot spaced from said main fixed slot, a pair of movable thread tensioning guides normally disposed at opposite ends of said quill compartment and movable to operative threading position in alignment with said main and auxiliary fixed slots, each of said thread tensioning guides having an upwardly-opening, weft-receiving slot, and spring means biasing said thread tensioning guides toward normal separated position at opposite ends of said quill compartment.

18. A self-threading shuttle comprising a housing defining a quill compartment open at the top and bottom thereof, retaining elements disposed at opposite sides of said compartment for rotatably supporting a quill, said housing having a main fixed centrally disposed upwardly opening slot, an auxiliary fixed upwardly opening slot spaced from said main fixed slot, a pair of movable thread tensioning guides normally disposed at opposite ends of said quill compartment and movable to operative threading position in alignment with said main and auxiliary fixed slots, each of said thread tensioning guides having an upwardly-opening, weft-receiving slot, a depressible rack bar associated with each of said thread tensioning guides, a pinion meshing with a respective rack bar, a lever operatively connecting each pinion with a respective thread tensioning guide, and spring means biasing said thread tensioning guides toward normal separated position at opposite ends of said quill compartment.

RICHARD A. GRIEFEN.
FRANZ C. MOSTERTZ.

No references cited.